United States Patent [19]
Kirby

[11] Patent Number: 5,896,485
[45] Date of Patent: Apr. 20, 1999

[54] EQUIPMENT BACKPLANE FOR PROVIDING MECHANICAL SUPPORT AND A COMMUNICATIONS PATH BETWEEN EQUIPMENT MODULES

[75] Inventor: Henry Kirby, Waterford, United Kingdom

[73] Assignee: Northern Telecom Limited, Montreal, Canada

[21] Appl. No.: 08/812,681

[22] Filed: Mar. 6, 1997

[30] Foreign Application Priority Data

Mar. 22, 1996 [GB] United Kingdom ............... 9606107

[51] Int. Cl.⁶ .......................................... G02B 6/36
[52] U.S. Cl. ............................... 385/134; 385/53
[58] Field of Search ........................ 385/24, 31, 53, 385/55, 56, 88–94, 134–137, 139

[56] References Cited

U.S. PATENT DOCUMENTS

| | | | |
|---|---|---|---|
| 4,432,604 | 2/1984 | Schwab | 385/90 X |
| 4,738,632 | 4/1988 | Schmidt et al. | 439/341 |
| 4,863,232 | 9/1989 | Kwa | 385/89 |
| 4,890,894 | 1/1990 | Kwa | 385/56 |
| 4,895,424 | 1/1990 | Hughes | 385/56 |
| 5,091,985 | 2/1992 | Heidemann | 385/33 |
| 5,134,679 | 7/1992 | Robin et al. | 385/90 |
| 5,151,961 | 9/1992 | Hvezda et al. | 385/92 X |
| 5,181,168 | 1/1993 | Seitz et al. | 361/427 |
| 5,182,780 | 1/1993 | Robertson | 385/53 X |
| 5,218,654 | 6/1993 | Sauter | 385/24 |

FOREIGN PATENT DOCUMENTS

| | | |
|---|---|---|
| 0602726 | 6/1994 | European Pat. Off. |
| 2201561 | 9/1988 | United Kingdom . |

Primary Examiner—John D. Lee
Attorney, Agent, or Firm—John D. Crane

[57] ABSTRACT

A backplane comprises a support structure which has a plurality of apertures defined along it, the apertures communicating with an optical path extending along the structure. An equipment module has a connector which carries optical devices, the connector engaging with one of the apertures so as to provide mechanical support for the module and to put optical devices into communication with the optical path. Preferably the backplane also has electrical conductors which couple with contact lobes on the connector for powering the module. Preferably the optical devices are moveable between shielded and operable positions.

11 Claims, 5 Drawing Sheets

EQUIPMENT BACKPLANE FOR PROVIDING MECHANICAL SUPPORT AND A COMMUNICATIONS PATH BETWEEN EQUIPMENT MODULES

TECHNICAL FIELD

This invention relates to a backplane arrangement for coupling equipment modules.

BACKGROUND OF THE INVENTION

In telecommunications systems it is common to find a rack of equipment modules which perform the different functions of the system, such as interfacing to subscriber lines and switching. Building an installation in the form of modules allows simpler upgrades or repairs of the installation, with just those parts of the installation requiring change being affected. Typically the modules are held in a case which provides mechanical support for the modules. The case may also have some form of backplane to which each module couples, the backplane providing a path to guide signals between modules.

The backplane may comprise a set of conductive tracks to guide electrical signals between modules. Alternatively, an optical backplane may be used if a high signal bandwidth is required or if immunity to electrical interference is required.

UK Patent Application GB 2,201,561A describes a data handling system comprising a set of modules which are releasably retained in a racking system. An optical data link connects the modules. The link comprises one or more light transmissive bars which span the racking, apertures in the racking allowing light to couple between the bars and the modules. A separate electronic backplane extends along the rear wall of the racking to provide power supply to the modules.

U.S. Pat. No. 5,091,985 describes a signal connecting device for establishing communication paths between units in a rack. An optical waveguide is supported on a rear wall of the rack in which the units are held.

SUMMARY OF THE INVENTION

The present invention seeks to provide an improved equipment backplane.

According to one aspect of the present invention there is provided an equipment arrangement comprising an equipment module and a backplane comprising a support structure which has a plurality of apertures defined along it, which apertures communicate with an optical path extending along the support structure, the module having a connector which carries optical devices, the connector being adapted in use to engage with one of the apertures so as to provide mechanical support for the module and to put the optical devices into communication with the optical path.

This has the advantage of not requiring a bulky case to support modules, as the backplane itself provides mechanical support. Such cases are expensive and restricting in terms of the size of modules which they can accommodate.

Preferably the connector of a module is a bayonet having a set of lobes and each of the apertures in the backplane structure is complementarily shaped to receive the bayonet, the bayonet being rotatable between a first position in which the bayonet aligns with the aperture so as to insert therein, and a secured position in which the lobes of the bayonet engage against an inner face of the backplane support structure.

Preferably the backplane also has electrical conductors. Advantageously these are power rails which can be used for powering the modules. Thus a single backplane structure provides mechanical support, optical communication and power supply for modules.

Preferably the electrical conductors are held adjacent to where in use a connector of a module fits, with at least one of the connector lobes having an electrical contact which in the secured position contacts one of the conductors. Preferably each of two of the connector lobes has an electrical contact which contacts one of the conductors to power the module. This allows a single connector to perform mechanical support, optical communication and power supply for a module.

Preferably the optical devices are moveable between a shielded position and an operable position in which they extend beyond the connector. This can be achieved by carrying the optical devices on an insert which slideably an moves within the body of the connector. This has the advantage of minimising damage to the sensitive optical devices, by protecting them when the module is uncoupled from the backplane.

Further aspects of the invention include a backplane support structure and an equipment module for use in the above equipment arrangement.

Another aspect of the invention provides a method of supporting an equipment module in an equipment arrangement comprising a backplane comprising a support structure which has a plurality of apertures defined along it, which apertures communicate with an optical path extending along the support structure, the module having a connector which carries optical devices, the method comprising engaging the connector with one of the apertures so as to provide mechanical support for the module and to put the optical devices into communication with the optical path.

BRIEF DESCRIPTION OF THE DRAWINGS

An embodiment of the invention will now be described, by way of example only, with reference to the accompanying drawings in which.

DESCRIPTION OF PREFERRED EMBODIMENTS

Figure 1:
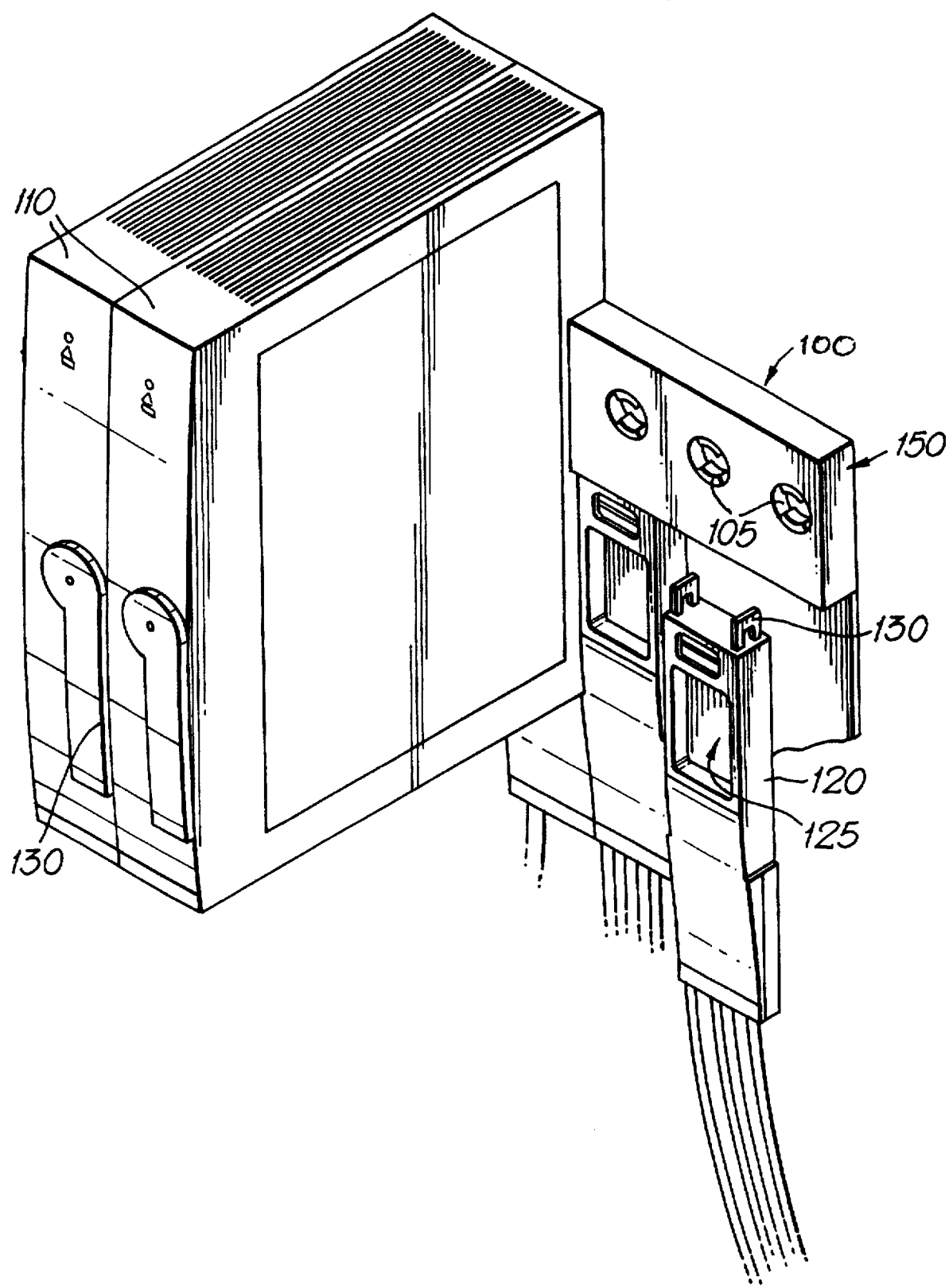
FIG. 1 is a perspective view of several modules coupled to a backplane.

FIG. 1 shows two functional modules 110 coupled to a backplane 100. A typical installation has modules with the following functions:

power supply, coupling to a mains supply and deriving a regulated supply for other modules in the installation;

network interface, coupling to optical fibres or copper cables which lead to or from other parts of the network;

cross-connect, performing switching and routing of signals;

subscriber service, performing various subscriber services;

battery back-up and charge, maintaining a set of batteries in anticipation of a mains power failure.

Each module is sealed to protect the internal electronic/ optical components from effects of the environment such as dust and moisture and to EMC/RFI screen the internal components from the effects of stray electro-magnetic fields. A front face of each module may have a handle 130 to aid fitting and removal of the module. Alternatively, a lock may be provided on an exposed face of the module for use with a specialised tool to fit or remove the module. Modules 110 mate with a backplane structure 100, engaging with apertures 105 in a front panel of the backplane. The backplane provides mechanical support for the modules as well as a medium for allowing interconnection of signals with other modules. It will be appreciated that while it is preferred to form apertures 105 in the front panel of the backplane the apertures could be defined in one of the other exposed faces of the backplane structure, such as the upper face.

A lead termination 120, such as a power cable or copper cable couples to the rear of a module 110. This termination connects by hooks 130 or some other suitable connecting means to the lower face of backplane 100 for additional mechanical support. Typically terminations 120 carry a mains cable, a group of subscriber lines or a cable leading to another part of the network, depending upon the particular function of the module 110 to which they are coupled.

Figure 2:
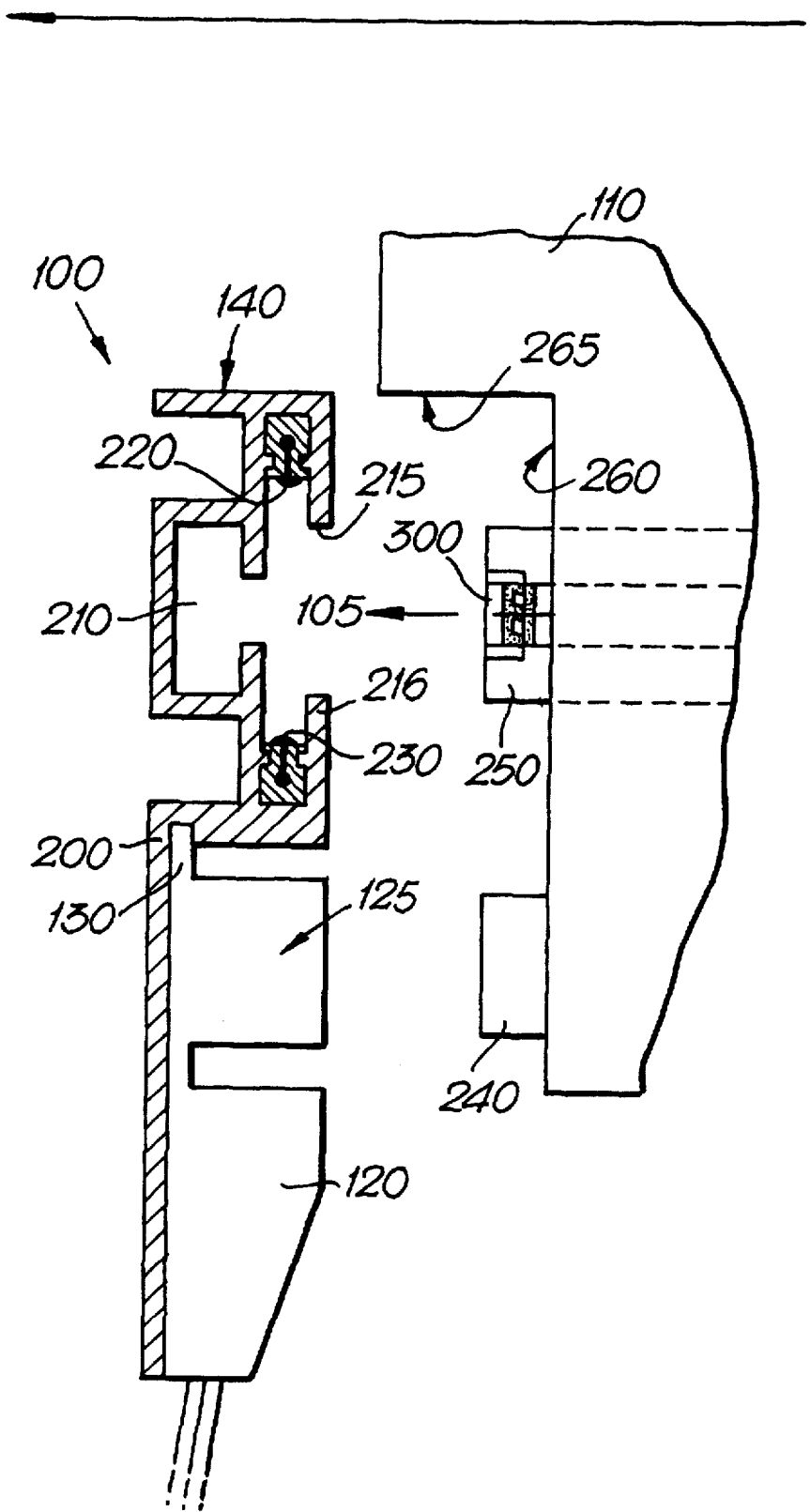
FIG. 2 is a cross-sectional view of a module being brought into engagement with the backplane.

FIG. 2 is a cross-sectional view of a module 110 being brought into engagement with one of the apertures 105 in backplane 100. Within backplane 100 there is a cavity 210 carrying an optical medium to support optical communication. Backplane 100 is formed as an aluminium extrusion 200. A front panel of backplane 100 has an upper lip 215 and a lower lip 216. Power conductor rails 220, 230 are supported in the upper and lower sections of the backplane behind lips 215, 216 directly adjacent to the cavity where, in use, a module connector 250 fits. Preferably an upper conductor 220 is maintained at a positive voltage of around 60V and the lower conductor 230 is held at ground (0V).

Figure 6:
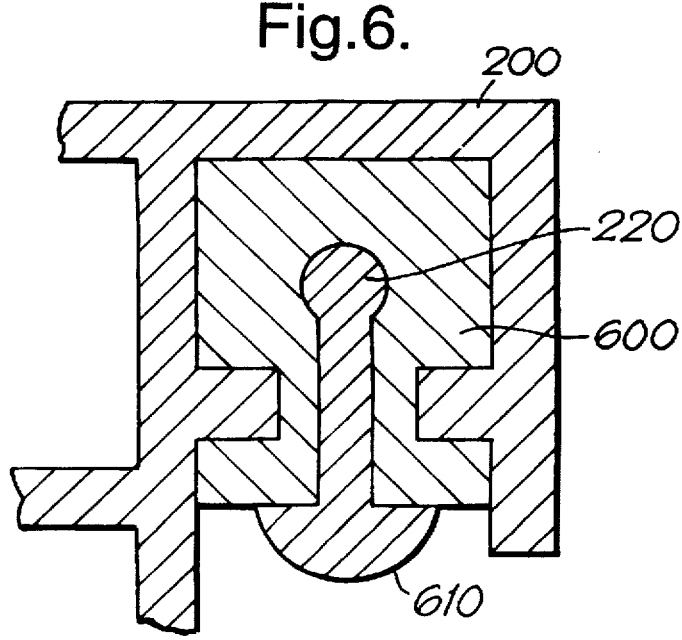
FIG. 6 is a cross-sectional view of a detailed part of the backplane structure shown in FIGS. 2 and 5.

FIG. 6 is a more detailed cross-sectional view of the part of the backplane which supports a conductor. Conductor 220 has a face 610 to which a conductor lobe of a module can press for electrical connection. Conductor 220 is insulated from the backplane support structure 200 by an insulating insert 600 to prevent currents leaking through the support structure. Insulating material 600 may comprise a plastics or rubber compound which is sufficiently resilient to support conductor 220 when a contact lobe on a module presses against mating surface 610. The insulating material can be injection moulded around the conductor or alternatively can be formed as a separate part with a slot to accommodate the conductor.

Referring again to FIG. 2, each module has a section 260 which is formed with a shape so as to mate with backplane 100 for mechanical support. This can be a generally U-shaped section with the complete U-shaped portion fitting over the backplane. Alternatively, as shown in FIG. 2, the module has a stepped portion such that face 265 of the module rests upon upper face 140 of the backplane when the module is engaged with the backplane. The lower portion of module 110 has a multi-pin plug 240 which mates with a corresponding multi-pin socket 125 defined in termination 120, the termination coupling to the lower face of the backplane structure.

Modules also have a connector part 250 which fits into aperture 105 in the backplane structure and locks so as to provide mechanical support for a module and coupling to power conductor rails 220, 230.

Figure 3:
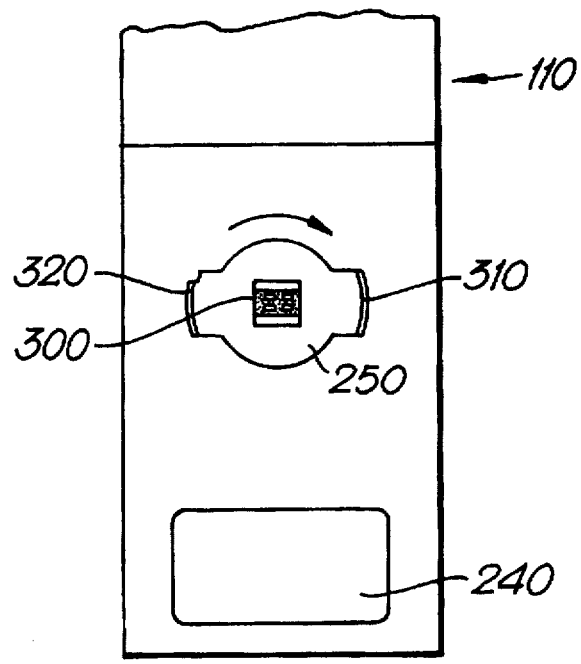
FIG. 3 is a more detailed view of the connector of the module shown in FIGS. 1 and 2.

FIG. 3 shows module connector 250 in more detail. A bayonet form of connector is preferable, with insulated contact lobes 310, 320 that may couple with power rails 220, 230 in the backplane. Connector 250 also carries one or more optical devices 300 to support communication through optical medium 210 of the backplane.

Figure 4:
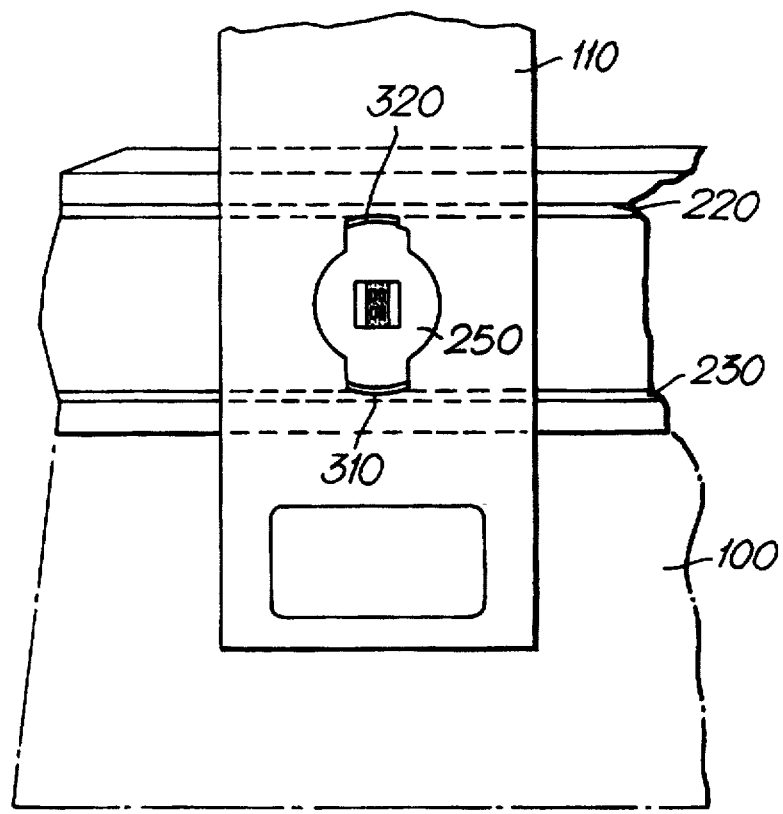
FIG. 4 shows the connector of FIG. 3 engaged with the backplane.
Figure 5:
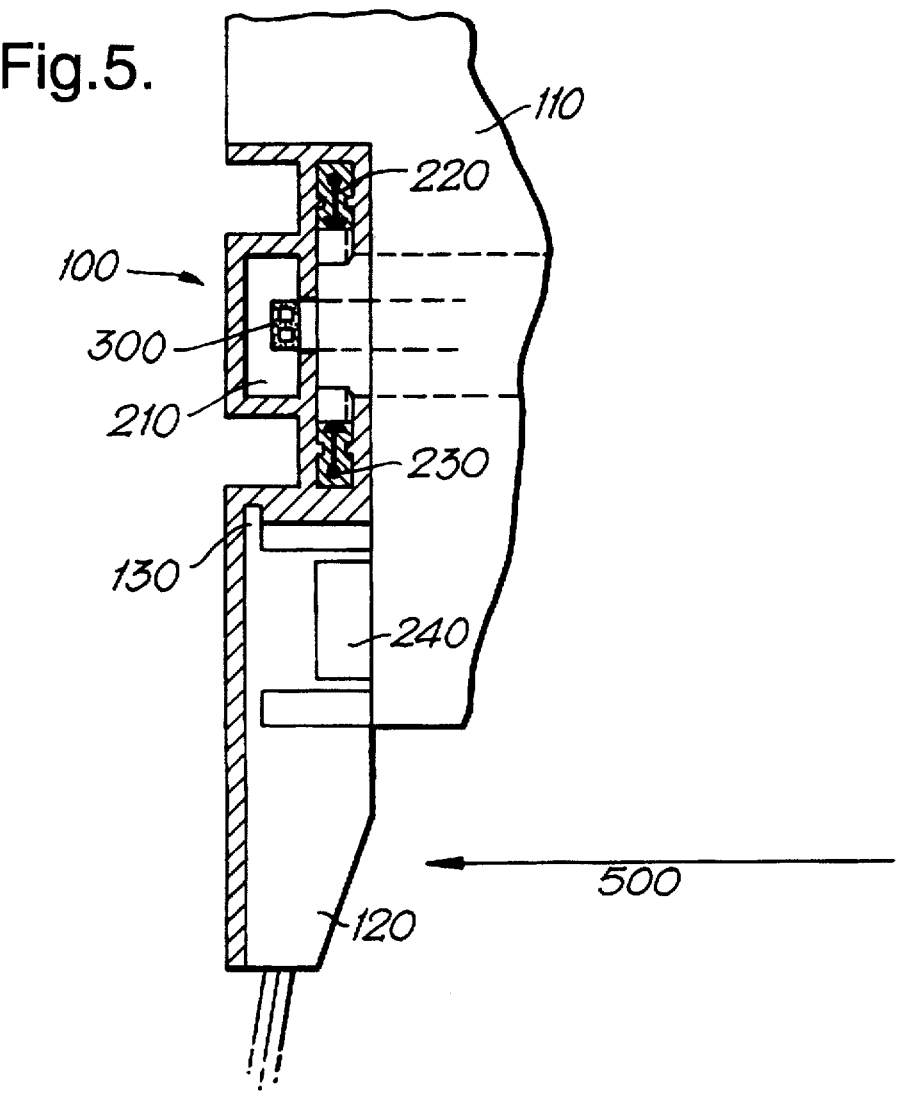
FIG. 5 is a cross-sectional view of a module engaged with the backplane.

FIGS. 4 and 5 show a module 110 engaged with backplane 100. The coupling process which occurs to bring the module from the disengaged state shown in FIGS. 2 and 3 to the engaged state shown in FIGS. 4 and 5 will now be described. Firstly module 110 is located against backplane 100 with upper surface 265 of the module resting upon upper face 140 of the backplane. Connector 250 at this time is aligned in the manner shown in FIG. 3, with lobes 310, 320 lying in a horizontal position. As the module is located against the backplane, connector 250 fits into aperture 105 in the front face of the backplane. With the module seated, connector 250 is turned through one-quarter of a turn (90°). Initial rotation of the bayonet secures the module to the backplane. Subsequent rotation draws the module into intimate contact with the backplane. At the periphery of the connector, the first contact lobe 310 grounds on the 0 volt rail 230 inside the backplane, and then the second contact lobe 320 contacts the 60V rail 220. The module is then powered.

The arrangement just described has a connector 250 where each lobe 310, 320 carries a single electrical contact for pressing against an electrical conductor. In an alternative arrangement a connector lobe can carry two or more electrical contacts which are insulated from one another. For example, a single one of the connector lobes can carry contacts for pressing against both the positive and ground power rails which are supported adjacent one another in the backplane. The contacts on each connector lobe can be mounted on the forward and rearward parts of the lobe as viewed in the direction of insertion of the lobe into the aperture of the backplane.

Rotation of connector 250 also pushes optical devices 300 forward in direction 500 such that when the module is fully engaged they are located adjacent to, or extend into, optical cavity 210. When the module is in the disengaged state shown in FIG. 2 the optical devices are shielded by the connector body to prevent any accidental damage to them. When the module is in fully engaged state, as shown in FIG. 5, the optical devices are exposed so as to perform their optical transmitting/receiving functions. The optical devices are held on a carrier insert which slideably moves within the body of the connector.

Rotation of connector 250 is effected by a direct or geared coupling to a handle on the front face of the module, such as by handle 130 shown in FIG. 1. Alternatively the connector can be coupled directly, or through a geared mechanism, to a lock on an exposed face of the module, the lock co-operating with a specialised tool for coupling and decoupling the module.

Figure 7:
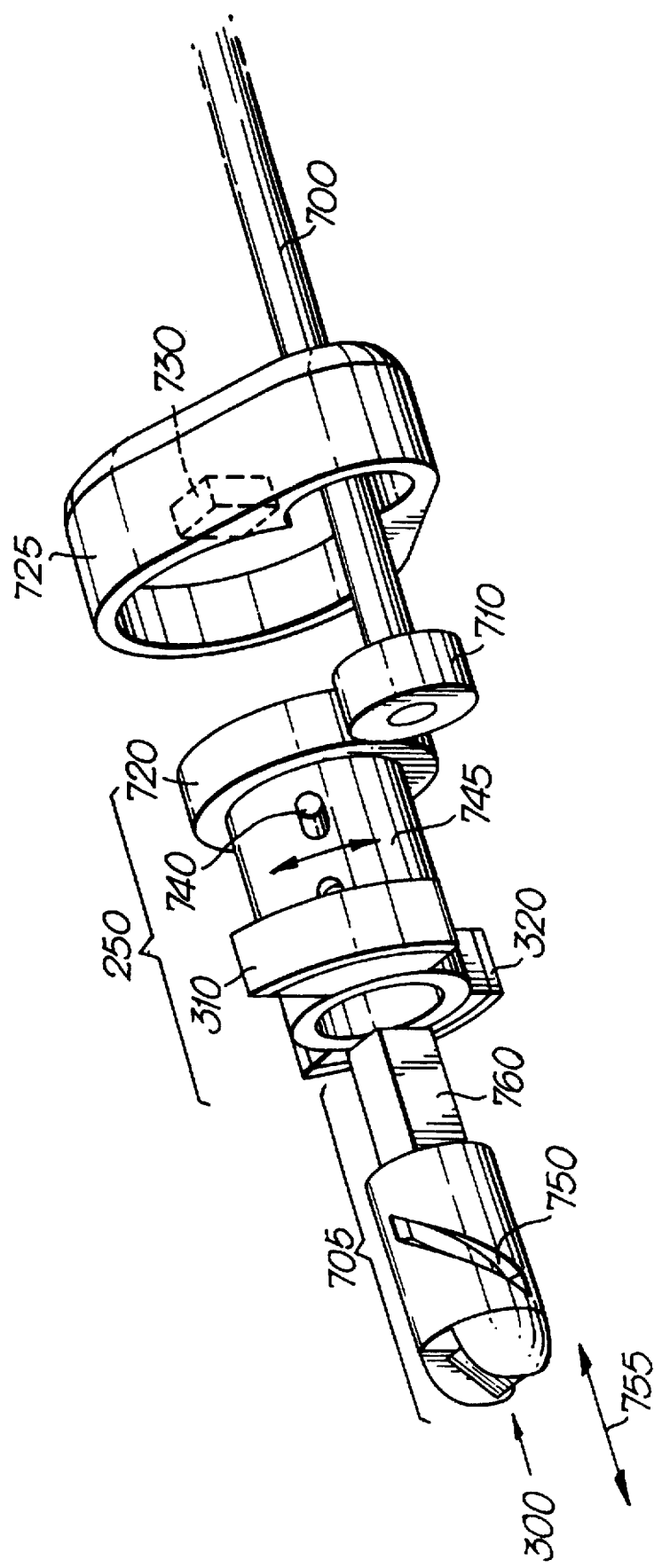
FIG. 7 is an exploded view of one form of actuating mechanism for a connector of a module.

FIG. 7 is an exploded view of one form of actuating mechanism to effect rotation of connector 250 and movement of optical devices 300. Optical devices 300 are carried on part 705 which slides within section 250 and part 725, bar 760 at the rear of part 705 slideably fitting within guide slot 730. Operating rod 700, which is connected to a handle or lock on the front face of the module, in use applies a turning force to part 725. This moves spur gear 710 around the periphery of drive gear 720, thereby turning section 250 in one of the directions shown by arrow 745. Drive pin 740 mounted on section 250 extends inwardly, locating in a helical slot 750 which is defined around the periphery of part 705. As section 250 is turned, the action of the drive pin urges part 705 in the one of the directions shown by arrow 755, guide slot 730 converting rotational movement of the drive pin around part 705 into linear movement of part 705. Thus as connector 250 rotates during the action of coupling to the backplane, part 705 carries optical devices 300 between a shielded position, in which the optical devices are shielded by section 250, and an operating position in which devices 300 are moved forward, clear of section 250.

The optical medium 210 within the backplane structure is free space or some other optically conductive medium. Optical devices 300 on connector 250 are active devices, such as a laser transmitter and a PIN receiver which respectively launch light into and tap light from medium 210. Alternatively the devices can comprise a beam-splitter which taps a portion of optical radiation from medium 210 to active devices located deeper inside module 110. Time-division, frequency-division or spread spectrum multiplexing techniques, or a combination of these can be used to optimise use of the optical medium and minimise interference.

Preferably backplane support structure 200 has features (not illustrated) which allow the structure to be fitted to a wall or other secure mounting surface. As an example, a flange with apertures to allow screw-fitting to a wall may be formed along one edge of the backplane. Such features could be formed during the same extrusion process as the structure to form an integral part of structure 200.

Backplane 100 may be extended by mating additional similar segments to those which are already installed. Additional segments can be locked into end 150 (FIG. 1) of an existing segment in an end-to-end or right-angled fashion. Alternatively two spaced apart segments can be linked by an opto-electric umbilical.

What is claimed is:

1. An equipment arrangement comprising an equipment module and a backplane comprising a support structure which has a plurality of apertures defined along it, which apertures communicate with an optical path extending along the support structure, the module having a connector which carries optical devices, the connector being adapted in use to engage and lock with one of the apertures so as to provide mechanical support for the module and to put the optical devices into communication with the optical path.

2. An equipment arrangement according to claim 1 wherein the backplane also has electrical conductors.

3. An equipment arrangement according to claim 1 wherein the connector of a module is a bayonet having a set of lobes and each of the apertures is complementarily shaped to receive the bayonet, the bayonet a being rotatable between a first position in which the bayonet aligns with the aperture so as to insert therein, and a secured position in which the lobes of the bayonet engage against an inner face of the backplane support structure.

4. An equipment arrangement according to claim 3 wherein the backplane also has electrical conductors.

5. An equipment arrangement according to claim 4 wherein the electrical conductors are held adjacent to where in use a connector of a module fits, at least one of the connector lobes having an electrical contact which in the secured position contacts one of the conductors.

6. An equipment arrangement according to claim 5 wherein the electrical conductors comprise power rails, each of two of the connector lobes having an electrical contact which in the secured position contacts one of the rails to power the module.

7. An equipment arrangement according to claim 1 wherein the optical devices are moveable between a shielded position and an operable position in which they extend beyond the connector.

8. An equipment arrangement according to claim 7 wherein the optical devices are carried on an insert which slideably moves within the body of the connector.

9. An equipment arrangement according to claim 1 wherein the optical path allows interconnection of signals between modules.

10. An equipment module for use in an equipment arrangement comprising the module and a backplane comprising a support structure which has a plurality of apertures defined along it, which apertures communicate with an optical path extending along the support structure, the module having a connector which carries optical devices, and being adapted, in use, to engage with one of the apertures and lock so as to provide mechanical support for the module and to put the optical devices into communication with the optical path.

11. A method of supporting an equipment module in an equipment arrangement comprising a backplane comprising a support structure which has a plurality of apertures defined along it, which apertures communicate with an optical path extending along the support structure, the module having a connector which carries optical devices, the method comprising engaging and locking the connector with one of the apertures so as to provide mechanical support for the module and to put the optical devices into communication with the optical path.

* * * * *